United States Patent [19]
Arita et al.

[11] Patent Number: 5,922,476
[45] Date of Patent: Jul. 13, 1999

[54] COMPOSITE MEMBER AND PROCESS FOR PRODUCING THE SAME

[75] Inventors: Hiroaki Arita; Haruo Ichikawa, both of Himeji; Hiroshi Sagane, Sakai, all of Japan

[73] Assignee: Daicel-Huels, Ltd., Tokyo, Japan

[21] Appl. No.: 08/817,148

[22] PCT Filed: Aug. 28, 1996

[86] PCT No.: PCT/JP96/02403

§ 371 Date: Apr. 9, 1997

§ 102(e) Date: Apr. 9, 1997

[87] PCT Pub. No.: WO97/07975

PCT Pub. Date: Mar. 6, 1997

[30] Foreign Application Priority Data

Aug. 28, 1995 [JP] Japan .................................. 7/218774

[51] Int. Cl.$^6$ ...................................................... B32B 27/08
[52] U.S. Cl. .................. 428/515; 156/309.9; 156/324.4; 264/255; 264/259; 264/279
[58] Field of Search ............................. 156/309.9, 324.4; 264/248, 250, 255, 259, 271.1, 279; 428/515

[56] References Cited

U.S. PATENT DOCUMENTS 3,899,378  8/1975  Wragg et al. ......................... 156/73.5

FOREIGN PATENT DOCUMENTS

| 50-25682 | 3/1975 | Japan . |
| 2-150439 | 6/1990 | Japan . |
| 3-138144 | 6/1991 | Japan . |
| 05301973 | 11/1993 | Japan . |
| 5301973 | 11/1993 | Japan . |
| 7-11013 | 1/1995 | Japan . |

*Primary Examiner*—Robert Dawson
*Assistant Examiner*—D. Aylward
*Attorney, Agent, or Firm*—Birch, Stewart, Kolasch & Birch

[57] ABSTRACT

A composite member is obtained which includes a thermoplastic resin and a rubber directly and firmly adhering to each other. A composite member is obtained by adhering a molded element of a thermoplastic resin including a homo- or co-polymer of a vinyl cyanide including acrylonitrile, and a rubber molded element constituting a rubber composition containing a vinyl cyanide as a comonomer by means of heating. The resin molded element may be formed from, for example, AS resin, ABS resin or an polymer alloy containing ABS resin. The rubber molded element may be composed of a vulcanizable rubber composition containing NBR or another rubber. Both the molded elements can adhere to each other by contacting the resin molded element with the rubber molded element closely and heating at least either the resin molded element or the rubber molded element by means of melting, vulcanization or the like.

11 Claims, No Drawings

10

COMPOSITE MEMBER AND PROCESS FOR PRODUCING THE SAME

TECHNICAL FIELD

This invention relates to a composite member comprising a thermoplastic resin component and a rubber component, and to a process for producing the same.

BACKGROUND TECHNOLOGY

A rubber is used as a component of a composite material as produced by adhering the rubber to other material such as metals, fibers, plastics and the like. However, the adhesion of a vulcanized rubber with other material generally requires a few or several steps.

Such vulcanized rubber as an adherent is different from other materials in the point that it contains various species of compounding agents (extenders) such as softening agents, fillers, vulcanization-accelerators, antioxidants (age resistors) and so on. In general, a surface of a rubber may practically be contaminated by bloom of the compounding agents or adhesion of dusting powder or dust. Therefore, when the vulcanized rubber adheres to other material, a process that comprises the steps of roughening the surface of the rubber by means of a sand paper, a wire brush, blast or others, and removing or eliminating shavings of the rubber adhering to the surface with the use of air or wiping out with the use of acetone, toluene or other solvents for rubbers, and adhering the rubber to other material with an interposition of an adequate primer or adhesive, and drying the resultant, is generally employed.

The primer or adhesive may, however, practically contain a solvent, thus adding working-environmental problems or safety problems. Further, these complicated several steps make automation of the process for compounding difficult.

There have been attempts to simplify adhesion steps of a rubber with other materials. By way of illustration, in a production process of a chemical composite of one molding material containing an aliphatic polyamide as a base, and other carboxyl group-containing rubber (Japanese Patent Application Laid-open No. 150439/1990 (JP-A-2-150439)), there is mentioned a technology that insures a strong adhesion by means of the formation of an amide bond in an interface between the rubber and the plastic without an adhesive. Japanese Patent Application Laid-open No. 138144/1991 (JP-A-3-138144) discloses a composite member as produced by bonding a fiber-reinforced polyamide molded article and a vulcanized rubber molded article.

In these composites, however, there is such a great limitation that the rubber component is restricted to a carboxyl group-containing rubber, and that vulcanization of the rubber is limited to peroxide-vulcanization. Further, when such composites are applied to ordinary rubbers as produced by sulfur-vulcanization, the aliphatic polyamide does not adhere to the sulfur-vulcanized rubber. Incidentally, such sulfur-vulcanization is the most popularly employed technology.

Recently, a novel production process of a composite of a vulcanized rubber and a polyamide has been proposed (Japanese Patent Application Laid-open No. 11013/1995 (JP-A-7-11013)). This process is a process for producing a composite comprising a conventional rubber and a polyamide as strongly bonded each other by incorporating a silane compound having a specific structural formula into a standard rubber available in a market. According to this technology, although there is no limitation that the rubber component should be a carboxyl group-containing rubber or a peroxide-vulcanized rubber, the plastic is restricted to a polyamide or a polyamide-containing resin composition, and the silane compound having the specific structural formula has to be incorporated into the rubber.

It is, therefore, an object of the present invention to provide a composite member which does not require a complicated physical and chemical treatment or the use of an adhesive and insures strong or firm bond between a thermoplastic resin and a rubber, and a process of producing the same.

Another object of the invention is to provide a composite member which can be applied to compounding of a combination of a thermoplastic resin and a rubber in a comparatively broad range, and provides a firm bond between the thermoplastic resin and the rubber, and a production process thereof.

It is a further object of the invention to provide a composite member which insures firm bond of even a sulfur-vulcanized rubber with a thermoplastic resin, and a process of producing the composite member.

Yet another object of the invention is to provide a process of producing a composite member which simplifies a complicated process for compounding, and provides a remarkable reduction in cost.

DISCLOSURE OF THE INVENTION

To accomplish the above-mentioned objects, the inventors of the present invention did much research regarding combinations of numerous thermoplastic resins and rubbers, and, as a result, found that a composite member, in which an interface between a thermoplastic resin and a vulcanized rubber is firmly bonded, can be obtained by heating a molded article of a thermoplastic resin comprising a homopolymer or copolymer of acrylonitrile, and a molded article of a rubber composition comprising acrylonitrile as a comonomer. The present invention has been accomplished based on these findings.

Thus, the composite member of the present invention comprises a molded element of a thermoplastic resin composed of a homo- or co-polymer of vinyl cyanide, and a rubber molded element composed of a rubber composition containing a vinyl cyanide as a comonomer, where said resin molded element and rubber molded element directly bonds each other.

The composite member can be prepared by a process which comprises adhering a resin molded element of a thermoplastic resin composed of a homo- or co-polymer of a vinyl cyanide to a rubber molded element composed of a rubber composition containing a vinyl cyanide as a comonomer, wherein the adhesion is carried out by heating at least either of the resin molded element or the rubber molded element.

It should be understood that the term "heating" as used in this specification means and includes heating for melting the thermoplastic resin and/or the rubber composition for injection, heating for vulcanization of the rubber composition, heating of a prepreg (preformed article) of the thermoplastic resin and/or the rubber composition, and other heating technologies. A thermoplastic resin or its composition may generically be referred to as "the thermoplastic resin."

BEST MODE FOR PRACTICING THE INVENTION

The resin molded element (molded unit or molded section of resin) is formed from a thermoplastic resin comprising a homopolymer or copolymer of vinyl cyanide, and the rubber molded element is formed from a composition comprising a rubber containing a vinyl cyanide as a comonomer. The vinyl cyanide includes, for example, acrylonitrile, methacrylonitrile and others, among which acrylonitrile is preferably employed.

[Thermoplastic resin]

There is no particular limitation on the thermoplastic resin as far as it being a homopolymer or copolymer of vinyl cyanide. To be specific, examples of the thermoplastic resin include PAN (polyacrylonitrile), AS resin (an acrylonitrile-styrene copolymer), rubber-modified AS resin (a rubber-modified acrylonitrile-styrene copolymer) and so on.

As a rubber component in the rubber-modified AS resin, there may be mentioned, for instance, a polybutadiene, acrylic rubber, chlorinated polyethylene, an ethylene-propylene rubber (EPDM), an ethylene-vinyl acetate copolymer and the like.

The rubber-modified AS resin include, for example, ABS resin (an acrylonitrile-butadiene-styrene copolymer) containing polybutadiene, AAS resin (an acrylonitrile-acrylic acid ester-styrene copolymer) containing an acrylic rubber, ACS resin (an acrylonitrile-chlorinated polyethylene-styrene copolymer) containing chlorinated polyethylene, AES resin (an acrylonitrile-EPDM-styrene copolymer) containing an ethylene-propylene rubber (EPDM), AXS resin (an acrylonitrile-EVA-styrene copolymer) containing an ethylene-vinyl acetate copolymer and other polymers. The rubber-modified AS resin may practically be graft polymers as produced by graft polymerization of acrylonitrile and styrene to a rubber component.

These thermoplastic resins may be used singly or in combination.

The preferred thermoplastic resin includes AS resin and rubber-modified AS resins (in particular, ABS resin, etc.).

The content of the vinyl cyanide in the thermoplastic resin can be selected from a range, for example, of about 10 to 100% by weight and preferably about 20 to 100% by weight based on the total weight of the resin. The vinyl cyanide content in the AS resin is, for instance, about 10 to 50% by weight (preferably about 20 to 35% by weight) based on the total weight of the resin. In the rubber-modified AS resin, the rubber content is about 5 to 50% by weight (e.g., about 10 to 50% by weight) and preferably about 10 to 30% by weight, and the proportion of the vinyl cyanide is about 10 to 50% by weight (preferably about 15 to 30% by weight), typically speaking.

It is preferable that the thermoplastic resin or resin composition thereof does not deform in the heating step. By way of illustration, when a molded article of a thermoplastic resin or its composition is prepared beforehand, a rubber composition adheres to the molded article and heated to vulcanize the rubber composition for adhesion, as in the below-mentioned two-step method, the vulcanization temperature (curing temperature) may be around 140 to 180° C. Therefore, the softening temperature or thermal deformation temperature of the thermoplastic resin or its composition may advantageously be not lower than the vulcanization temperature (e.g., about 145 to 220° C. and preferably about 150 to 200° C.).

This thermoplastic resin generally has a softening temperature (a softening point) of not higher than 140° C., it may be used as a resin composition having an intended thermal deformation temperature as produced by blending a polymer having a high softening temperature, such as an engineering plastic. As examples of the engineering plastic, there may be mentioned polyamides (e.g. nylon 6, nylon 66, nylon 610, nylon 612, etc.), polyesters [e.g. poly(ethylene terephthalate), poly(butylene terephthalate) and other poly($C_{2-6}$ alkylene terephthalate), poly(ethylene naphthalate), poly(butylene naphthalate) and other poly($C_{2-6}$ alkylene naphthalate)], polycarbonates (e.g. bisphenol A-series polycarbonates), polyacetals (e.g. polyoxymethylene homopolymer, copolymers each having an oxymethylene unit), modified poly(phenylene ether), poly(phenylene sulfide) and so forth. Further, polyimide, polysulfone, poly (ether ketone) and other super-engineering plastics may also be employed. These engineering plastics can be used independently or in combination. Such resin compositions may be polymer alloys each comprising the rubber modified AS resin inclusive of ABS resin, and the polymer having a high softening temperature.

The preferred thermoplastic resin composition includes, for example, polymer alloys of the rubber modified AS resin such as ABS resin, and a polymer including polyamide, polyester, polycarbonate or the like.

A ratio of the polymer having a high softening temperature in the polymer alloy may be selected from a range of, for example, about 10 to 300 parts by weight and preferably about 20 to 200 parts by weight relative to 100 parts by weight of the thermoplastic resin.

For providing a high thermal deformation temperature, filler may be added to the thermoplastic resin or its resin composition (e.g., a polymer alloy). As the filler, there may be mentioned, for instance, a glass fiber, a carbon fiber, a polyester fiber, a nylon fiber, vinylon (polyvinyl alcohol fiber), an aromatic polyamide fiber, a whisker and other fibrous fillers, silica, mica, talc, clay, calcium carbonate, magnesium carbonate, carbon black and other particulate fillers and the like. These fillers may be used singly or in combination. The amount of the filler is, for example, about 5 to 100 parts by weight and preferably about 10 to 70 parts by weight (e.g., about 10 to 50 parts by weight) relative to 100 parts by weight of the thermoplastic resin.

Incidentally, when the vulcanization (thionation) of the rubber composition can be effected at a low temperature by means of a combination of a vulcanizing agent, a vulcanization activator, an auxiliary or other additive, a little deformation of the molded element of the thermoplastic resin in the vulcanization or curing of the rubber may not be a problem in practical use occasionally. In such a case, a thermoplastic resin or its composition having a low softening temperature may be used. Further, such thermoplastic resin or its composition having a low softening temperature may also be used in a case that the rubber composition is vulcanized beforehand, and to the vulcanized molded article is injected or poured the thermoplastic resin or its composition in the molten state.

Moreover, various additives such as antioxidants, ultraviolet ray inhibitors, plasticizers, flame-retarders, antistatics and so forth may be added to the thermoplastic resin or its composition, according to demanded properties of the resin molded element.

[Rubber]

The rubber comprising a vinyl cyanide (in particular, acrylonitrile) as a comonomer (hereinafter may briefly be referred to as "the rubber") is not strictly limited as far as a rubber which comprises a vinyl cyanide as a comonomer. To be specific, the rubber includes, for instance, an acrylonitrile-butadiene rubber (nitrile rubber, NBR), a hydrogenated acrylonitrile-butadiene rubber (hydrogenated NBR), an acrylonitrile-isoprene rubber (NIR), an acrylonitrile-isoprene-butadiene rubber (NBIR) and an acrylic rubber comprising an acrylonitrile-alkyl acrylate copolymer. As the alkyl acrylate, there may be mentioned ethyl acrylate, butyl acrylate, 2-ethylhexyl acrylate and other $C_{2-8}$ alkyl acrylates and so on. The rubber may be carboxylated by means of a carboxyl group-containing monomer or acid anhydride group-containing monomer such as (meth) acrylic acid, maleic anhydride or others, or it may be partially crosslinked with the use of divinylbenzene or the like. The rubber may also be a blended product with other rubber component (e.g., EPDM rubber, polybutadiene rubber, etc.) or a resin (e.g., poly(vinyl chloride)). Further, the rubber may be a thermoplastic elastomer containing a vinyl cyanide inclusive of acrylonitrile.

The preferred rubber includes, for example, an acrylonitrile-butadiene rubber (NBR), a carboxylated NBR, a polymer blend with a rubber component or a resin such as poly(vinyl chloride).

The bond of the rubber with respect to the molded element or unit of the thermoplastic resin tends to be higher or stronger with an increasing content of the vinyl cyanide in the rubber. The content of the vinyl cyanide is, for example about 10% by weight or more (e.g., about 10 to 60% by weight), and preferably about 20% by weight or more (e.g., about 20 to 50% by weight) based on the total weight of the rubber.

The rubber can usually, be vulcanized or thionated. Therefore, such rubber may generally be used as a rubber composition containing a vulcanizing agent, a vulcanization accelerator, a softening agent, a filler or the like.

As the vulcanizing agent, there may be mentioned sulfur and sulfur-containing compounds, organic peroxides, metal oxides and so forth. Typical examples of the sulfur-containing compound include dithiodimorpholine, dipentamethylenethiuram hexasulfide, tetramethylthiuram disulfide, 2-morpholinodithiodibenzothiazole, caprolactam disulfide and other sulfur-donors.

As practical examples of the organic peroxide, there may be mentioned 2,5-dimethyl-2,5-bis-(tert-butyl peroxide)-hexane, dicumyl peroxide, 4,4-di-tert-butyl-peroxy-n-butyl valerate, 1,1-di-tert-butylperoxy-3,3,5-trimethyl-cyclohexane, bis-(tert-butylperoxyisopropyl) benzene and so forth.

The metal oxide includes, for instance, a zinc oxide, a magnesium oxide and lead monoxide.

A ratio of the vulcanizing agent is, preferably, about 1 to 10 parts by weight relative to 100 parts by weight of the rubber.

The vulcanization accelerator or activator may be selected according to the species of the vulcanizing agent. When sulfur or sulfur-containing compound is used as the vulcanizing agent, use can be made, as the vulcanization accelerator, of benzothiazoles [e.g., 2-mercaptobenzothiazole (MBT), dibenzothiazyl disulfide (MBTS), etc.], bezothiazolesulfenamides [N-t-butyl-2-benzothiazolesulfenamide (BBS), N-cyclohexyl-2-benzothiazolesulfenamide (CBS), etc.], dithiocarbamate salts, a xanthogen, a thiourea, a dithiocarbamylsulfenamide, a guanidine, a thiuram and others. When the organic peroxide is employed as the vulcanizing agent, the vulcanization accelerator includes, ethylene glycol di(meth)acrylate, butylene glycol di(meth)acrylate, trimethylolpropane tri (meth)acrylate and other (meth)acrylates, triallyl cyanurate, triallyl isocyanurate, triallyl phosphate, triallyl trimellitate and other triallylates, methaphenilenedimaleimide and the like.

The amount of the vulcanization-accelerator or vulcanization-activator as incorporated in the rubber composition may be selected depending on desired properties or characteristics of the rubber, vulcanization rate, a combination with the vulcanizing agent, and is, for example, about 0.5 to 5 parts by weight (e.g., about 0.5 to 4 parts by weight) relative to 100 parts by weight of the rubber.

As the softening agent, use may be made of conventional petroleum-series process oils. To be specific, paraffin oil, naphthene oil, aromatic oil and so on can be used as the softening agent. Further, the softening agent also includes phthalic acid esters, cebacic acid esters, adipic acid esters, phosphoric acid esters and other low molecular weight plasticizers, and other various polyester-series plasticizers, chlorinated polyethylene or the like can also be used according to an intended application.

A relative ratio of the softening agent may optionally be selected according to desired properties or characteristics of the rubber, in the range of, for example, about 0 to 150 parts by weight, to 100 parts by weight of the rubber.

Examples of the filler include conventional substances generally used in rubber compositions, such as carbon black, silicic acid, silicates, calcium carbonate, zinc oxide, barium sulfate, magnesium sulfate, talc and kaolin.

The amount of the filler may be selected, according to intended properties or characteristics of the rubber, from a range of about 10 to 300 parts by weight (preferably about 20 to 300 parts by weight, e.g., about 50 to 300 parts by weight) relative to 100 parts by weight of the rubber.

In addition, depending on required properties of the molded element of the rubber composition, any of the various additives such as age resistors, antioxidants, antiozonants, ultraviolet ray absorbers, tackifiers, plasticizers, lubricants and coloring agents may be added to the rubber composition.

The rubber, vulcanizing agent, vulcanization accelerator, softening agent, filler and/or other additives can be blended in a similar manner to a kneading technology of conventional rubber compositions. That is, a process is generally employed which process comprises kneading the rubber, filler and softening agent with the use of a kneader or role, and kneading the resultant composition with the vulcanizing agent, vulcanization-accelerator or -activator at a low temperature with the use of a role. The order of addition and kneading of these components may be altered to some extent from the viewpoint of dispersion properties of the extenders (components) and a risk of scorching.

[Composite member and production process thereof]

The composite member of the present invention comprises a resin molded article of the thermoplastic resin, and a rubber molded article which directly bonds or combines in a bonding site (adhering region) of the resin molded article and comprises the rubber composition. The rubber molded element or unit may preferably be composed of a vulcanized rubber. Namely, the composite member may preferably comprise the resin molded element (molded unit) and the vulcanized rubber molded element (molded unit) both of which directly adhere and bond each other in the bonding region (adhering site). It is supposed that the resin molded element and the rubber molded element fuse each other in the junction part by means of heating.

The composite member can be manufactured by heating at least either molded element of the resin molded element or the rubber molded element and adhering an interface between the resin molded element and the rubber molded element. The heating temperature may be not lower than a glass transition temperature of the thermoplastic resin. At least one junction surface of the resin molded element and the rubber molded element may only be heated, and the whole of the resin molded element (molded part) and/or the rubber molded element (molded part) may be heated. The composite member may preferably be produced by contacting the molten or heated resin molded element and molten or heated rubber molded element closely. The rubber molded element may be vulcanized beforehand, or it may be a prepreg (premolded article) which has not been vulcanized. Except a case when the resin molded element or rubber molded element is used as a melt, the heating temperature is preferably selected from a range which is not higher than the thermal deformation temperature of the thermoplastic resin (e.g., about 100 to 250° C.) and in the range of a vulcanizable temperature in which the rubber molded article can be vulcanized (e.g., about 110 to 200° C.). The heating temperature may be chosen from a range according to the species of the thermoplastic resin and the rubber composition, and is, for instance, about 120 to 200° C., preferably about 130 to 190° C. and particularly about 150 to 180° C.

The composite member can be produced by one-step method, two-step method or three-step method, corresponding to the number of molding steps. In more concrete, the processes of adhering the resin molded element and the rubber molded element is exemplified as follows.

(1) In the one-step method, the resin molded element and rubber molded element may adhere to each other by, in the same manner as in one-step two-color injection molding technology, melting the thermoplastic resin and vulcanizable rubber composition respectively, injecting the molten products into a mold for molding, heating them under conditions for achieving vulcanization of the rubber composition, and adhering the resin molded element to the rubber molded element. In this technology, the process may also be effected by injecting and molding, first, either of the thermoplastic resin or the rubber composition into the mold, and injecting and molding the other into the mold. The rubber composition may be injection molded beforehand, and it may be vulcanized by pressing the molded composition at a predetermined temperature for a predetermined period.

(2) In the two-step method, the resin molded element and the rubber molded element may adhere to each other by molding, beforehand, either of the thermoplastic resin or the vulcanizable rubber composition to form a molded article by means of a molding technology such as press molding, injection molding and extrusion molding, and injecting and contacting a melt of the other component in the mold for molding. When the thermoplastic resin and the rubber composition are used in combination, the rubber composition may be preformed or premolded beforehand, or may be molded as a vulcanized molded article. Further, this process may also be effected by adhering a molded article of the thermoplastic resin to the rubber composition and vulcanizing the resultant in predetermined conditions for vulcanization of the rubber.

(3) According to the three-step method, the resin molded element and the rubber molded element may adhere to each other by pressing or adhering a molded article of the thermoplastic resin and a molded article of the vulcanized rubber composition, each of which produced by molding technology such as press molding, injection molding or extrusion molding, and heating the adhered composite at a temperature not lower than a glass transition temperature of the thermoplastic resin.

The vulcanization condition and adhesion condition can be selected according to the rubber composition, in particular a morphology or shape of the vulcanized composition and the molded article thereof, and, generally, pressing and adhesion are conducted at a pressure of about 50 to 2,000 kgf/cm$^2$ (preferably about 200 to 1,000 kgf/cm$^2$) and at a temperature of about 120 to 200° C. (preferably about 140 to 180° C.) for about 10 seconds to 60 minutes (preferably about 30 seconds to 30 minutes). In the vulcanization, it should be noted with respect to thermal deformation and burning of the resin molded element composed of the thermoplastic resin.

According to the present invention, a composite member comprising a thermoplastic resin and a rubber bonding firmly each to other can be obtained by the simplified compounding process. Such process can be carried out without a complicated physicochemical treatment or the use of an adhesive. Further, the process can be applied to compounding of a thermoplastic resin and a rubber, which contain vinyl cyanide as a common constitutive unit, in comparatively broad ranges. Further, the process provides a composite member comprising a thermoplastic resin and a rubber firmly bonded with each other even when the rubber has been vulcanized with sulfur. As thus described, the present invention insures simplification of a complicated compounding process and therefore provides a remarkable decrease of the cost.

INDUSTRIAL APPLICABILITY

The composite member of the invention can be applied to various applications in a broad range such as a submersible camera, submersible glasses (submersible spectacles), a rubber-coated role, a hose-junction member, a flange, a vibration-impact absorbable member, a conveyor belt, a driving belt, a packing, a flap and so on.

EXAMPLES

The following examples are intended to describe the present invention in more detail, but should by no means be construed to limit the scope of the invention.

[Preparation of rubber composition]

The six species of rubber compositions (1) to (3), (5), (6) and (7) shown in Table 1 were prepared, and the following rubber composition (4) available in market was used. The examples in which the rubber compositions (1) to (5) were respectively employed were corresponding to examples of the present invention. Examples in which the rubber compositions (6) and (7) were respectively used were corresponding to comparative examples of the invention.

In the preparation of the rubber compositions, the rubber, filler and softening agent were kneaded with a kneader. Thereafter, the resultant kneaded product was further kneaded with a vulcanizing agent, vulcanization accelerator and age resistor with the use of a role.

(1) Rubber 1: NBR (a product of Nippon Synthetic Rubber Co., Ltd., trade name JSR N215SL, acrylonitrile (AN) content 48% by weight) was used.

(2) Rubber 2: NBR (a product of Nippon Synthetic Rubber Co., Ltd., trade name JSR N230SL, AN content 35% by weight) was used.

(3) Rubber 3: NBR (a product of Nippon Synthetic Rubber Co., Ltd., trade name JSR N250S, AN content 20% by weight) was used.

(4) Rubber 4: Poly(vinyl chloride)-containing NBR (a product of Nippon Synthetic Rubber Co., Ltd., trade name JSR NV, NBR/PVC=70/30 (weight %))

(5) Rubber 5: A rubber (EPDM)-containing NBR (a product of Nippon Synthetic Rubber Co., Ltd., trade name JSR NE, NBR/EPDM=70/30 (weight %)) was used.

(6) Rubber 6: NR (naturally-occurring rubber) was used.

(7) Rubber 7: SBR (a product of Nippon Synthetic Rubber, trade name JSR SBR 1714) was used.

TABLE 1

(Rubber Formulation)

|  | Rubber 1 | Rubber 2 | Rubber 3 | Rubber 5 | Rubber 6 | Rubber 7 |
|---|---|---|---|---|---|---|
| JSR N215SL[1] | 100 | — | — | — | — | — |
| JSR N230SL[1] | — | 100 | — | — | — | — |
| JSR N250S[1] | — | — | 100 | — | — | — |
| JSR NE | — | — | — | 100 | — | — |
| NR[2] | — | — | — | — | 100 | — |
| SBR 1714[3] | — | — | — | — | — | 150 |
| ZnO | 5 | 5 | 5 | — | 5 | 4.5 |
| Sulfur | 1.5 | 1.5 | 1.5 | 1.5 | 2.5 | 2.63 |
| Stearic acid | 1 | 1 | 1 | 1 | 2 | 1.5 |
| MBTS[4] | 1 | 1 | 1 | 1 | 1 | 1 |
| PAN[5] | — | — | — | — | 1 | — |
| BBS[6] | — | — | — | — | — | 1.5 |
| Carbon black | 40 | 40 | 40 | 40 | — | 75 |

[1])Acrylonitrile-butadiene rubber, manufactured by Nippon Synthetic Rubber Co., Ltd.
[2])Naturally-occurring rubber
[3])Styrene butadiene rubber, maufactured by Nippon Synthetic Rubber Co., Ltd.
[4])Dibenzothiazyl disulfide
[5])N-Phenyl-1-naphthylamine
[6])N-t-butyl-2-benzothiazolesulfenamide

[Thermoplastic resin composition]

The following eight species of resin compositions were used. The examples using the thermoplastic resin compositions (a) to (f) were corresponding to working examples of the present invention, and the examples using resin composition (g) or (h) were corresponding to comparative examples of the invention.

(a) Glass fiber-reinforced AS resin (reinforced with 20% of glass fiber (GF)) (a product of Daicel Chemical Industries, Ltd., trade name CEBIEN N-GRSJ)

(b) ABS resin (a product of Daicel Chemical Industries, Ltd., trade name CEBIEN V500)

(c) ABS-nylon 6 alloy (a product of Daicel Chemical Industries, Ltd., trade name NOVALLOY A2302 (GF 10%))

(d) ABS-nylon 6 alloy (a product of Daicel Chemical Industries, Ltd., trade name NOVALLOY A2502 (GF 10%))

(e) ABS-poly(butylene terephthalate) (PBT) alloy (a product of Daicel Chemical Industries, Ltd., trade name NOVALLOY B)

(f) ABS-polycarbonate (PC) alloy (a product of Daicel Chemical Industries, Ltd., trade name NOVALLOY S)

(g) Nylon 6 (a product of Ube Industries, Ltd., trade name UBE NYLON 3014U)

(h) Glass fiber-reinformed poly(butylene terephthalate) (PBT) (reinforced with 30% of GF, a product of Polyplastics Co., Ltd., trade name DURANEX)

Example 1

[Preparation of adhesion test piece]

Two pieces (25 mm×50 mm×3 mm) of a resin were inserted into both ends in longitudinal direction of a cavity (25 mm×140 mm×3 mm) of a mold with remaining a cavity (25 mm×40 mm×3 mm) in the center. In the cavity in the center was placed a rubber composition, and the resultant was pressed at a pressure of 500 kgf/cm² and at a temperature of 170° C. for 10 to 20 minutes. After removing burr (flash) of the rubber to clarify the interface, the test piece was subjected to tensile test, and the rupture strength (kgf/cm²) was determined at a tensile rate of 50 mm/minute. The results are set forth in Table 2.

TABLE 2

Tensile rupture strength (kgf/cm²)

|  |  | Thermoplastic resin | | | | | | | |
|---|---|---|---|---|---|---|---|---|---|
|  |  | Examples | | | | | | Comparative Examples | |
|  | Rubber | (a) | (b) | (c) | (d) | (e) | (f) | (g) | (h) |
| Examples | Rubber 1 | 73 | 60 | 50 | 40 | 35 | 35 | 5 | 5 |
|  | Rubber 2 | 55 | 55 | 35 | 30 | 26 | 25 | 5 | 5 |
|  | Rubber 3 | 20 | 20 | 20 | 15 | 15 | 15 | 5 | 5 |
|  | Rubber 4 | 40 | 38 | 30 | 25 | 20 | 20 | 5 | 5 |
|  | Rubber 5 | 45 | 40 | 32 | 25 | 20 | 20 | 5 | 5 |
| Com. Ex. | Rubber 6 | 0 | 4 | 2 | 2 | 2 | 2 | 5 | 2 |
|  | Rubber 7 | 0 | 9 | 5 | 5 | 2 | 2 | 5 | 3 |

Example 2

A piece of a vulcanized rubber (25 mm×140 mm×1.5 mm) was inserted into a cavity (25 mm×140 mm×3 mm) of a mold, leaving a cavity (25 mm×140 mm×1.5 mm) over the rubber piece. A mold releasing paper (separating paper) was placed on one end of the rubber piece, and a thermoplastic resin molded article was placed on the releasing paper to press at a pressure of 500 kgf/cm² and at a temperature of 200° C. for 10 seconds. After removing burr or the like to clarify the interface, the test piece was subjected to the tensile test to determine the rupture strength (kgf/cm²) at a tensile rate of 50 mm/minute. The results are shown in Table 3.

TABLE 3

Tensile rupture strength (kgf/cm²)

|  |  | Thermoplastic resin | | | | | |
|---|---|---|---|---|---|---|---|
|  |  | Example | | | | Com. Ex. | |
|  | Rubber | (a) | (b) | (c) | (f) | (g) | (h) |
| Example | Rubber 1 | 80 | 75 | 60 | 40 | 3 | 2 |
|  | Rubber 2 | 60 | 55 | 45 | 30 | 3 | 3 |
|  | Rubber 3 | 35 | 30 | 25 | 15 | 3 | 2 |
|  | Rubber 4 | 45 | 33 | 28 | 25 | 2 | 2 |
| Com. Ex. | Rubber 6 | 0 | 0 | 0 | 0 | 0 | 0 |

Example 3

A piece of a vulcanized rubber (120 mm×60 mm×3 mm) was inserted into a cavity (120 mm×60 mm×8 mm) of a mold of an injection molding machine. A releasing paper was placed on one end of the rubber piece and a thermoplastic resin composition was injected and molded at a temperature of, depending on the species of the resin), from 190 to 250° C. The resultant test piece was taken out from the mold and subjected to the tensile test to determine the rupture strength (kgf/cm₂) at a tensile rate of 50 mm/minute. The results are set forth in Table 4.

TABLE 4

| | | Tensile rupture strength (kgf/cm²) | | | | | |
|---|---|---|---|---|---|---|---|
| | | Thermoplastic resin | | | | | |
| | | Example | | | | Com. Ex. | |
| | Rubber | (a) | (b) | (c) | (f) | (g) | (h) |
| Example | Rubber 1 | 70 | 55 | 45 | 35 | 0 | 0 |
| | Rubber 2 | 55 | 50 | 35 | 25 | 0 | 0 |
| | Rubber 3 | 35 | 30 | 25 | 15 | 0 | 0 |
| | Rubber 4 | 40 | 30 | 25 | 20 | 0 | 0 |
| Com. Ex. | Rubber 6 | 0 | 0 | 0 | 0 | 0 | 0 |

We claim:

1. A composite member which comprises a resin molded element of a thermoplastic resin comprising at least one member selected from the group consisting of a polyacrylonitrile, an acrylonitrile-acrylic acid ester-styrene copolymer, an acrylonitrile-chlorinated polyethylene-styrene copolymer, an acrylonitrile-EPDM-styrene copolymer, and an acrylonitrile-EVA-styrene copolymer, and a rubber molded element comprising a rubber composition containing a vinyl cyanide as a comonomer, said resin molded element and rubber molded element directly bonded to each other.

2. A composite member which comprises a resin molded element of a thermoplastic resin and a rubber molded element comprising a rubber composition containing a vinyl cyanide as a comonomer, wherein said thermoplastic resin comprises a polymer alloy or blend comprising a homo- or co-polymer of a vinyl cyanide and at least one member selected from the group consisting of a polyamide, a polyester, a polycarbonate, a polyacetal, a modified poly(phenylene ether), a poly(phenylene sulfide), a polyimide, a polysulfone and a poly(ether ketone), and said resin molded element and rubber molded element are directly bonded to each other.

3. A composite member as claimed in claim 1 or 2, wherein said vinyl cyanide is acrylonitrile.

4. A composite member as claimed in claim 2, wherein said homo- or co-polymer of a vinyl cyanide is at least one member selected from the group consisting of a polyacrylonitrile, an acrylonitrile-styrene resin and an acrylonitrile-butadiene-styrene resin.

5. A composite member as claimed in claim 1 or 2, wherein said rubber is an acrylonitrile-butadiene rubber.

6. A composite member as claimed in claim 1 or 2, wherein said rubber molded element is composed of a vulcanized rubber.

7. A composite member as claimed in claim 1, wherein a resin molded element of a thermoplastic resin comprising at least one member selected from the group consisting of a polyacrylonitrile, an acrylonitrile-acrylic acid ester-styrene copolymer, an acrylonitrile-chlorinated polyethylene-styrene copolymer, an acrylonitrile-EPDM-styrene copolymer, and an acrylonitrile-EVA-styrene copolymer, and a rubber molded article comprising a rubber composition containing an acrylonitrile-butadiene rubber directly adhere to each other in a bonding region, and the rubber molded element is a vulcanized element.

8. A process for producing a composite member which comprises the step of adhering a resin molded element of a thermoplastic resin comprising at least one member selected from the group consisting of a polyacrylonitrile, an acrylonitrile-acrylic acid ester-styrene copolymer, an acrylonitrile-chlorinated polyethylene-styrene copolymer, an acrylonitrile-EPDM-styrene copolymer, and an acrylonitrile-EVA-styrene copolymer, or comprising a polymer alloy or blend of a homo- or co-polymer of vinyl cyanide and at least one plastic selected from the group consisting of a polyamide, a polyester, a polycarbonate, a polyacetal, a modified poly(phenylene ether), a poly(phenylene sulfide), a polyimide, a polysulfone and a poly(ether ketone), to a rubber molded element composed of a rubber composition containing a vinyl cyanide as a comonomer, wherein at least either the resin molded element or the rubber molded element is heated for the adhesion.

9. A process according to claim 8, wherein the resin molded element and the rubber molded element closely contact each other, and said rubber molded element is subjected to vulcanization.

10. A process for producing a composite member which comprises the step of adhering a resin molded element of a thermoplastic resin comprising a homo- or co-polymer of a vinyl cyanide, to a rubber molded element composed of a rubber composition containing a vinyl cyanide as a comonomer, wherein at least either the resin molded element or the rubber molded element is heated for the adhesion, wherein the resin molded element and the rubber molded element adhere to each other by any of the following processes:

(1) a process which comprises the steps of melting a thermoplastic resin and a vulcanizable rubber composition respectively, injecting the resultant melts into a mold for molding, heating the molded article under conditions for effecting vulcanization of the rubber composition to adhere the resin molded element and the rubber molded element to each other; or (2) a process which comprises the steps of molding one composition of a thermoplastic resin and a vulcanizable rubber composition as a molded article beforehand, injecting a melt of the other composition to said molded article in a mold, and molding and adhering the resin molded element and the rubber molded element to each other.

11. A process according to claim 8, wherein the heating is conducted at a temperature of not lower than a thermal deformation temperature of a thermoplastic resin composition, and said heating temperature is a vulcanizable temperature of the rubber composition.

* * * * *

UNITED STATES PATENT AND TRADEMARK OFFICE
CERTIFICATE OF CORRECTION

PATENT NO. : 5,922,476
DATED : July 13, 1999
INVENTOR(S) : Arita et al.

It is certified that error appears in the above-identified patent and that said Letters Patent is hereby corrected as shown below:

In the category "[73] Assignee:" change "Daicel-Huels, Ltd., Tokyo, Japan" to

--Daicel-Huels, Ltd., Tokyo, Japan; and DAICEL CHEMICAL INDUSTRIES, LTD., Osaka, Japan--

Signed and Sealed this

Twenty-first Day of September, 1999

Attest:

Q. TODD DICKINSON

*Attesting Officer*  *Acting Commissioner of Patents and Trademarks*